(12) United States Patent
Strock et al.

(10) Patent No.: US 10,408,078 B2
(45) Date of Patent: Sep. 10, 2019

(54) BLADE RUB MATERIAL

(71) Applicant: United Technologies Corporation, Hartford, CT (US)

(72) Inventors: Christopher W. Strock, Kennebunk, ME (US); Changsheng Guo, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 937 days.

(21) Appl. No.: 14/761,496

(22) PCT Filed: Jan. 29, 2013

(86) PCT No.: PCT/US2013/023566
§ 371 (c)(1),
(2) Date: Jul. 16, 2015

(87) PCT Pub. No.: WO2014/120116
PCT Pub. Date: Aug. 7, 2014

(65) Prior Publication Data
US 2015/0322809 A1 Nov. 12, 2015

(51) Int. Cl.
*F01D 11/12* (2006.01)
*F01D 5/02* (2006.01)
(Continued)

(52) U.S. Cl.
CPC ............ *F01D 11/122* (2013.01); *B82Y 30/00* (2013.01); *F01D 5/02* (2013.01); *F01D 5/288* (2013.01);
(Continued)

(58) Field of Classification Search
CPC ... F01D 5/14; F01D 5/28; F01D 5/282; F01D 5/288; F01D 11/12; F01D 11/122
(Continued)

(56) References Cited

U.S. PATENT DOCUMENTS 3,575,427 A 4/1971 Lapac et al.
5,575,145 A 11/1996 O'Neill et al.
(Continued)

FOREIGN PATENT DOCUMENTS

EP 2169026 A2 3/2010
EP 2388441 A2 11/2011
(Continued)

OTHER PUBLICATIONS

International Search Report and Written Opinion for PCT/US2013/023570, dated Mar. 27, 2013.
(Continued)

*Primary Examiner* — Mark A Laurenzi
*Assistant Examiner* — Mickey H France
(74) *Attorney, Agent, or Firm* — Bachman & LaPointe, P.C.

(57) ABSTRACT

One aspect of the disclosure involves a nib material comprising a polymeric matrix and carbon nanotubes in the matrix. In one or more embodiments of any of the foregoing embodiments, the matrix comprises a silicone. In one or more embodiments of any of the foregoing embodiments, the rub material is at least 1.0 mm thick. In one or more embodiments of any of the foregoing embodiments, the silicone is selected from the group consisting of dimethyl- and fluoro-silicone rubbers and their copolymers. In one or more embodiments of any of the foregoing embodiments, the carbon nanotubes at least locally have a concentration of 1-20% by weight.

22 Claims, 5 Drawing Sheets

(51) Int. Cl.
    *F01D 25/24*     (2006.01)
    *B82Y 30/00*     (2011.01)
    *F01D 5/28*     (2006.01)

(52) U.S. Cl.
    CPC ............ *F01D 11/125* (2013.01); *F01D 25/24* (2013.01); *F05D 2300/224* (2013.01); *F05D 2300/437* (2013.01)

(58) Field of Classification Search
    USPC .............. 106/472, 638, 814, 816; 415/170.1, 415/173.1, 173.4, 173.6, 174.4; 416/224
    See application file for complete search history.

(56) References Cited

U.S. PATENT DOCUMENTS

| | | | |
|---|---|---|---|
| 5,580,217 | A | 12/1996 | Richards et al. |
| 6,299,935 | B1 | 10/2001 | Park et al. |
| 6,334,617 | B1 | 1/2002 | Putnam et al. |
| 6,365,222 | B1 | 4/2002 | Wagner et al. |
| 6,899,339 | B2 | 5/2005 | Sanders et al. |
| 7,931,828 | B2 | 4/2011 | Rice |
| 8,020,875 | B2 | 9/2011 | Putnam et al. |
| 8,034,153 | B2 | 10/2011 | Marchiando et al. |
| 8,178,205 | B2 | 5/2012 | Hong |
| 8,272,843 | B1 | 9/2012 | Ryznic et al. |
| 2003/0175116 | A1* | 9/2003 | Le Biez .................. F01D 5/20 415/173.4 |
| 2006/0059890 | A1 | 3/2006 | Sassanelli et al. |
| 2006/0111501 | A1 | 5/2006 | Cont et al. |
| 2007/0134411 | A1 | 6/2007 | Cont et al. |
| 2007/0197719 | A1 | 8/2007 | Putnam et al. |
| 2008/0166225 | A1 | 7/2008 | Strangman et al. |
| 2009/0104274 | A1 | 4/2009 | Khopade et al. |
| 2010/0068500 | A1 | 3/2010 | Nelson et al. |
| 2010/0095837 | A1 | 4/2010 | Suman |
| 2010/0327482 | A1 | 12/2010 | Nejhad et al. |
| 2011/0155945 | A1 | 6/2011 | Soong |
| 2011/0286839 | A1 | 11/2011 | Wojtyczka et al. |
| 2012/0183770 | A1* | 7/2012 | Bosnyak ................ B82Y 30/00 428/367 |
| 2013/0004323 | A1 | 1/2013 | Hansen et al. |

FOREIGN PATENT DOCUMENTS

| | | |
|---|---|---|
| EP | 2540973 A1 | 1/2013 |
| WO | 2014/120117 A1 | 8/2014 |

OTHER PUBLICATIONS

Solutions Flash: Improve Efficiency and Reduce Emissions with Abradable Coatings for Steam Turbines, Jul. 2012, Sulzer Metco, Winterthur, Switzerland.

Phillip Dowson et al., The Investigation of Suitability of Abradable Seal Materials for Application in Centrifugal Compressors and Steam Turbines, Proceedings of the Twentieth Turbomachinery Symposium, 1991, pp. 77-90, Texas A&M University, College Station, Texas.

International Search Report and Written Opinion for PCT/US2013/023566, dated Sep. 19, 2013.

RTV630 Technical Data Sheet, Jan. 9, 2013, Momentive, Performance Materials Inc., Waterford, NY.

Prof. Peter Mallon, Ph.D., Abstract: Nanofibre and multi-walled carbon nanotube (MWCNT) filled silicone elastomer composites with large strain and toughness enhancement, TUHH Polymer Composites, Nov. 16, 2011, Technische Universitat Hamburg-Harburg, Hamburg, Germany.

European Search Report for EP Patent Application No. 13873922.2, dated Aug. 19, 2016.

Communication under Rule 71(3) EPC dated Apr. 12, 2018 for European Patent Application No. 13873922.2.

\* cited by examiner

BLADE RUB MATERIAL

BACKGROUND

The disclosure relates to blade rub coatings. More particularly, the disclosure relates to abradable coatings for turbomachines such as gas turbine engines.

Abradable coatings (rub coatings) protect moving parts from damage during rub interaction and wear to establish a mating surface to the moving parts with smallest possible clearance. The coatings are used in turbomachines to interface with the tips of a rotating blade stage, tips of cantilevered vanes and knife edge seals.

In an exemplary turbomachine such as a gas turbine engine, more particularly, a turbofan engine, coatings may be used to interface with the blade tips of fan blade stages, compressor blade stages, and turbine blade stages. Because temperature generally increases through the fan and compressor and is yet much higher in the turbine, different blade materials, surrounding case materials, and coating materials may be desired at different locations along the engine.

With relatively low temperatures in the fan and compressor sections, relatively low temperature materials may be used for their blades and the surrounding cases (at least through upstream (lower pressure) portions of the compressor). The exemplary blade materials in such lower temperature stages may be aluminum alloy, titanium alloy, carbon fiber or other composite, combinations thereof, and the like. Similarly, relatively lower temperature case materials may be provided. Particularly because the case material is not subject to the centrifugal loading that blades are, even lower temperature capability materials may be used (e.g., aramid or other fiber composites) in the case than in the blades.

It is known to use a coating along the inboard or inner diameter (ID) surface of the case component to interface with the blade tips. Such coatings serve to protect blade tips from damage during rub contact between the blades and case. When the blade tips are protected from damage during rub, clearance between the blades and case ID can be set closer and tighter operating clearance can be achieved.

To limit blade damage, the adjacent surfaces of the surrounding shroud may be formed by an abradable rub coating. Examples of abradable rub coatings are found in U.S. Pat. Nos. 3,575,427, 6,334,617, and 8,020,875. One exemplary baseline coating comprises a silicone matrix with glass micro-balloon filler. Without the glass filler, the elastic properties of the abradable coating result in vibrational resonances and non-uniform rub response. The glass increases the effective modulus of the coating so as to reduce deformation associated with aerodynamic forces and resonances.

SUMMARY

One aspect of the disclosure involves a rub material comprising a polymeric matrix and carbon nanotubes in the matrix.

In one or more embodiments of any of the foregoing embodiments, the matrix comprises a silicone.

In one or more embodiments of any of the foregoing embodiments, the rub material is at least 1.0 mm thick.

In one or more embodiments of any of the foregoing embodiments, the silicone is selected from the group consisting of dimethyl- and fluoro-silicone rubbers and their copolymers.

In one or more embodiments of any of the foregoing embodiments, the carbon nanotubes at least locally have a concentration of 1-20% by weight.

In one or more embodiments of any of the foregoing embodiments, over a depth of at least 1 mm, the carbon nanotubes have said concentration of 1-20% by weight.

In one or more embodiments of any of the foregoing embodiments, over a depth of at least 1 mm, the carbon nanotubes have said concentration of 3-10% by weight.

In one or more embodiments of any of the foregoing embodiments, the carbon nanotubes have diameters of 1-40 nm.

In one or more embodiments of any of the foregoing embodiments, the carbon nanotubes have aspect ratios of 250-25,000:1.

In one or more embodiments of any of the foregoing embodiments, the material is injection molded in situ to a substrate or separately injection molded and bonded to the substrate.

In one or more embodiments of any of the foregoing embodiments, the material of further comprises up to 50% by volume additional filler.

In one or more embodiments of any of the foregoing embodiments, the material of further comprises up to 50% by volume additional filler selected from the group consisting of polymeric filler and glass micro-balloons and combinations thereof.

Another aspect of the disclosure is a turbomachine comprising: a plurality of blades, each blade having a tip, the blades mounted for rotation about an axis; a case surrounding the plurality of blades and having: a substrate; and a coating of the blade rub material on the substrate facing the blade tips.

In one or more embodiments of any of the foregoing embodiments, the blades comprise an aluminum based substrate and a polyurethane coating.

In one or more embodiments of any of the foregoing embodiments, the turbomachine is a gas turbine engine wherein the plurality of blades are a fan blade stage.

In one or more embodiments of any of the foregoing embodiments, the blades comprise an aluminum alloy or a titanium alloy.

Another aspect of the disclosure involves a blade rub segment comprising: a substrate; and a coating of the rub material of any foregoing embodiment on the substrate.

In one or more embodiments of any of the foregoing embodiments, the substrate has a transversely concave first surface and an opposite second surface and a plurality of mounting features.

In one or more embodiments of any of the foregoing embodiments, the coating has a transversely concave first surface and an opposite second surface secured to the substrate.

Another aspect of the disclosure involves a method for manufacturing the material of any of the foregoing embodiments, the method comprising: dispersing the carbon nanotubes in uncured polymer for the matrix material by high shear mixing.

In one or more embodiments of any of the foregoing embodiments, the carbon nanotubes are first dispersed in a solvent.

In one or more embodiments of any of the foregoing embodiments, the method further comprises dispersing a polymer filler into the uncured matrix by high shear mixing.

In one or more embodiments of any of the foregoing embodiments, the method further comprises injection molding of the uncured polymer and dispersed carbon nanotubes.

BRIEF DESCRIPTION OF THE DRAWINGS

Like reference numbers and designations in the various drawings indicate like elements.

DETAILED DESCRIPTION

Figure 1:
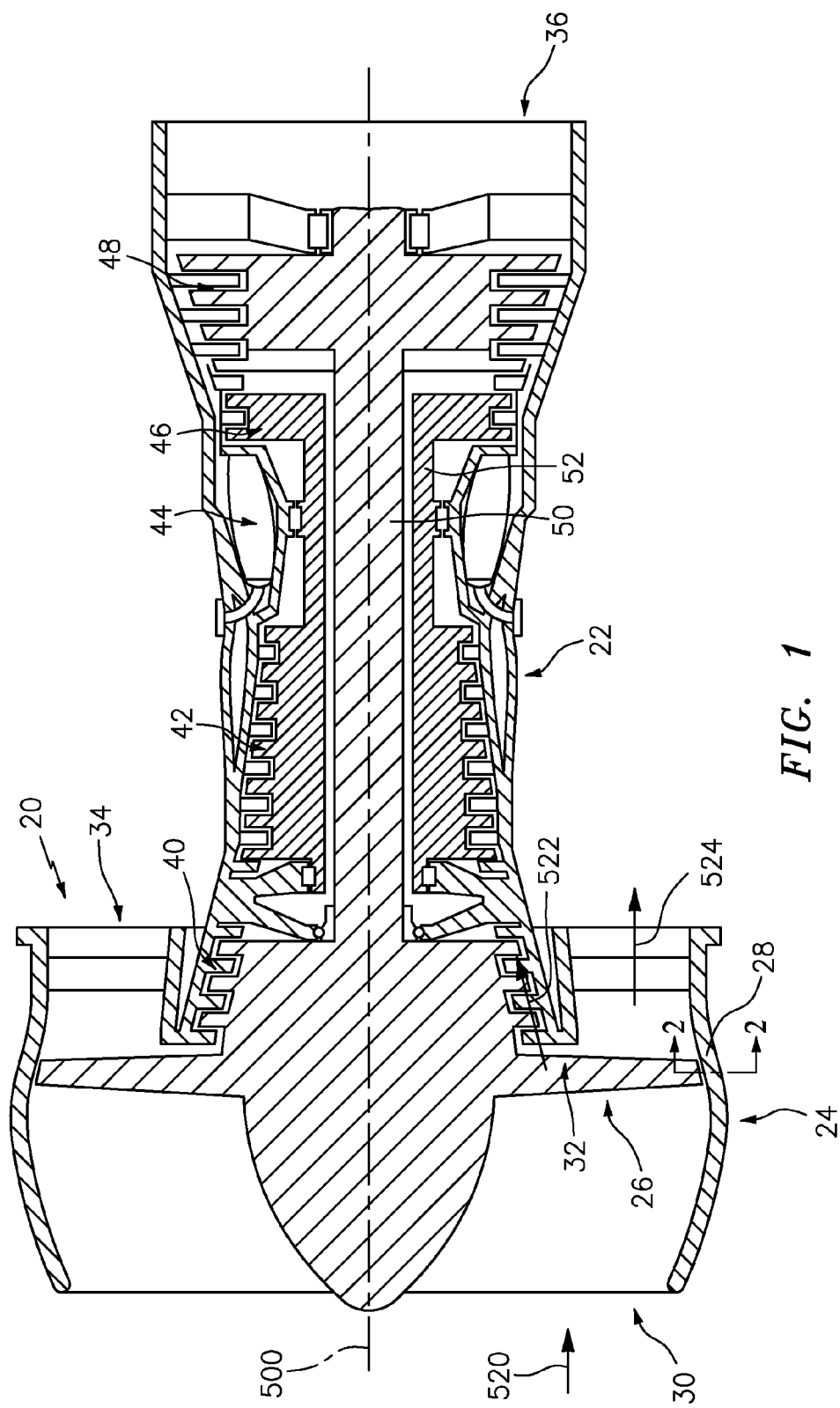
FIG. 1 is a partially schematic half-sectional view of a turbofan engine.

With a polyurethane coated airfoil, heat from rub friction conducts into the airfoil causing a temperature rise which, in turn, causes the coating to blister.

Thermal conductivity of the abradable coating material influences heating of the airfoil. If the coating has low thermal conductivity, it will poorly conduct away generated heat and airfoil temperatures would be higher than with an otherwise similar coating of greater thermal conductivity.

In the baseline coating (glass micro-balloon-filled silicone), because of machining of the coating during manufacture, or because of rub or erosion, the glass filler stands slightly proud of the polymer matrix. This results in preferential contact of the glass with the airfoil tips. Being of higher temperature capability than the polymer matrix, the glass filler undesirably allows the surface temperature during rub to reach a relatively higher temperature than if the polymer matrix were being rubbed. The extent of heating may approach the lower of the melting points of the glass and the mating aluminum blade. Not only does the glass filler produce a higher rub temperature, the hard phase (glass) particles increase the coating roughness after rub, reducing aerodynamic efficiency.

Use of carbon nanotubes (CNT) at least partially in place of glass micro-balloons increases the thermal conductivity of the coating above the conductivity of the silicone matrix alone to keep the surface temperature down during a rub. This will help to prevent damage to the polyurethane erosion-resistant coating on the airfoils.

Due to the high conductivity of carbon nanotubes (e.g., about 6600 w/mK at room temperature), high aspect ratio (from a low end of 250 up into the millions), and very small diameter (e.g., 1-40 nanometers, more particularly 1-2 nanometers for a single wall nanotube and up to about 40 for a multi-wall), only a small addition of CNTs are required to provide significant increase in thermal conductivity. For example, about 1 wt % CNT addition to silicone can result in about a doubling in thermal conductivity. Given the small scale of the CNTs and high conductivity, heat generated during rub is rapidly conducted to the matrix and to adjacent CNTs to greater depth. Exfoliation of the abradable surface occurs with rub at a temperature which causes matrix degradation. This allows both the filler and matrix to rub off during contact so as to limit forces experienced and allows the rub surface to adopt a profile that conforms to the shape of the blade path. This is in contrast to rub with low conductivity or larger scale fillers in which filler surface temperature may significantly exceed the capability of the matrix. The maximum rub temperature is thus limited by the decomposition temperature of the matrix.

Replacement of glass filler with CNT helps conduct heat into the coating material from the surface and reduces the maximum rub temperature. Reduction of the size of the filler helps produce such results by having a shorter conductive path to the matrix. Once the heat is conducted to the matrix, temperature capability of the matrix helps to limit the max. rub temperature by releasing the particles or filler.

Furthermore, the CNT will reinforce the soft silicone (e.g., acting as a fiber reinforcement to provide greater reinforcement than the glass micro-balloons do). Other considerations equal, this yields a tougher, more tear-resistant composite. CNTs also increase the visco-elastic damping properties of the polymer matrix and help to dampen vibrations that would otherwise contribute to increased post-rub surface roughness.

The CNT composite may thus provide one or more of higher strength, toughness and hardness, increased damping, and increased thermal conductivity compared with the baseline. Tuning of the material for particular applications may sacrifice some or all benefit in some of these areas to provide greater benefit on other(s).

Increased thermal conductivity reduces rub temperature. Increased damping helps keep the rubbed surface smooth by reducing vibration in the coating surface during rub. Increased toughness and tear resistance improves overall durability in service.

FIG. 1 shows a gas turbine engine 20 having an engine case 22 surrounding a centerline or central longitudinal axis 500. An exemplary gas turbine engine is a turbofan engine having a fan section 24 including a fan 26 within a fan case 28. The exemplary engine includes an inlet 30 at an upstream end of the fan case receiving an inlet flow along an inlet flowpath 520. The fan 26 has one or more stages 32 of fan blades. Downstream of the fan blades, the flowpath 520 splits into an inboard portion 522 being a core flowpath and passing through a core of the engine and an outboard portion 524 being a bypass flowpath exiting an outlet 34 of the fan case.

The core flowpath 522 proceeds downstream to an engine outlet 36 through one or more compressor sections, a combustor, and one or more turbine sections. The exemplary engine has two axial compressor sections and two axial turbine sections, although other configurations are equally applicable. From upstream to downstream there is a low pressure compressor section (LPC) 40, a high pressure compressor section (HPC) 42, a combustor section 44, a high pressure turbine section (HPT) 46, and a low pressure turbine section (LPT) 48. Each of the LPC, HPC, HPT, and LPT comprises one or more stages of blades which may be interspersed with one or more stages of stator vanes.

In the exemplary engine, the blade stages of the LPC and LPT are part of a low pressure spool mounted for rotation about the axis 500. The exemplary low pressure spool includes a shaft (low pressure shaft) 50 which couples the blade stages of the LPT to those of the LPC and allows the LPT to drive rotation of the LPC. In the exemplary engine, the shaft 50 also drives the fan. In the exemplary implementation, the fan is driven via a transmission (not shown, e.g., a fan gear drive system such as an epicyclic transmission) to allow the fan to rotate at a lower speed than the low pressure shaft.

The exemplary engine further includes a high pressure shaft 52 mounted for rotation about the axis 500 and coupling the blade stages of the HPT to those of the HPC to allow the HPT to drive rotation of the HPC. In the combustor 44, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

Figure 2:
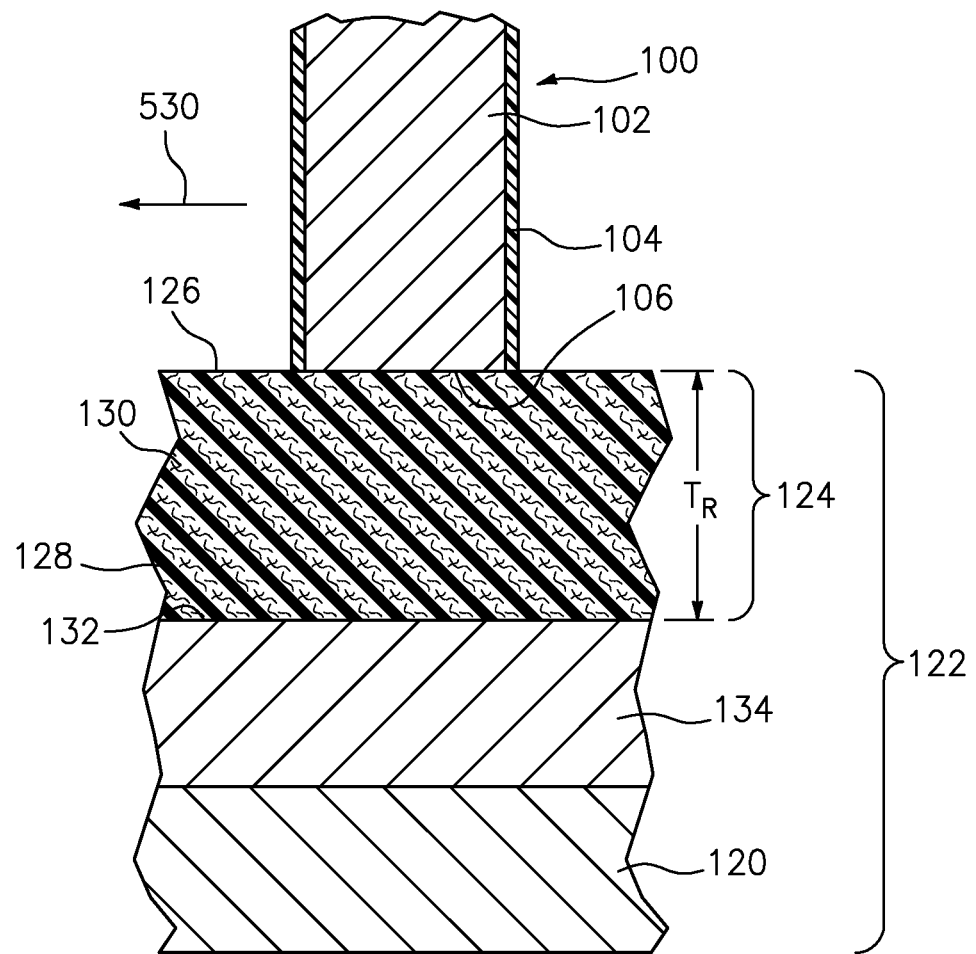
FIG. 2 is an enlarged transverse cutaway view of a fan blade tip region of the engine of FIG. 1 taken along line 2-2 and showing a first rub coating.

FIG. 2 shows a cutaway blade 100 showing a blade substrate (e.g., an aluminum alloy) 102 and a polymeric coating 104 (e.g., a polyurethane-based coating) on the substrate. The exemplary coating is along pressure and suction sides and spans the entire lateral surface of the blade between the leading edge and trailing edge. The exemplary coating, however, is not on the blade tip 106. If originally applied to the tip, the coating may have been essentially worn off during rub. Circumferential movement in a direction 530 is schematically shown.

FIG. 2 also shows an overall structure of the fan case facing the blade. This may include, in at least one example, a structural case 120. It may also include a multi-layer liner assembly 122. An inboard layer of the liner assembly may be formed by a rub material 124. The exemplary rub material 124 has an inboard/inner diameter (ID) surface 126 facing the blade tips and positioned to potentially rub with such tips during transient or other conditions.

As is discussed further below, the rub material 124 comprises a polymeric matrix material 128 and a carbon nanotube (CNT) filler 130. The exemplary rub material may be formed as a coating on an ID surface 132 of a substrate 134 of the liner assembly. An exemplary substrate 134 is titanium alloy AMS 4911. The rub material is shown as having an overall thickness $T_R$. Exemplary $T_R$ is 1-10 mm, more particularly, 3-6 mm.

The matrix material may initially be an uncured rubber such as a liquid silicone rubber (e.g., family including liquid dimethyl- and fluoro-silicone rubbers and their copolymers). The silicone rubber is processed as a liquid and cross-links with time and temperature to form a thermoset solid material. Exemplary matrix material is RTV630 of Momentive Performance Materials Inc., Columbus Ohio.

Exemplary CNT is present in the rub material at a concentration of about 8% by weight, more broadly 0.5-20% or 1-10% or 3-10% in the polymer (before adding any other filler). This (and other overall compositional averages (including other fillers)) may be an overall average or a local average (e.g., if concentrated in a depth zone (e.g., at least 1 mm or at least 2 mm) near the surface).

Exemplary single walled CNT thickness or diameter is 1-2 nm. Exemplary CNT aspect ratio is 250-25,000. Exemplary CNT material is P2-SWNT from Carbon Solutions, Inc. Riverside, Calif.

Exemplary multi-walled CNT thickness or diameter is 5-40 nm. Exemplary CNT aspect ratio is 250-10,000. Exemplary multi-walled CNT material is SN690342 from Sun Innovations, Inc., Fremont, Calif.

The coating may be manufactured by dispersing the CNTs in a solvent (e.g., dimethyl formamide) such as by sonication and then mixing the dispersion with the uncured silicone by high shear mixing. The coating may be applied by injection molding (e.g., directly to the substrate or separately followed by adhesive or solvent bonding to the substrate). Alternative material may be formed in sheets (e.g., by extrusion) and then cut and bonded for installation.

Figure 3:
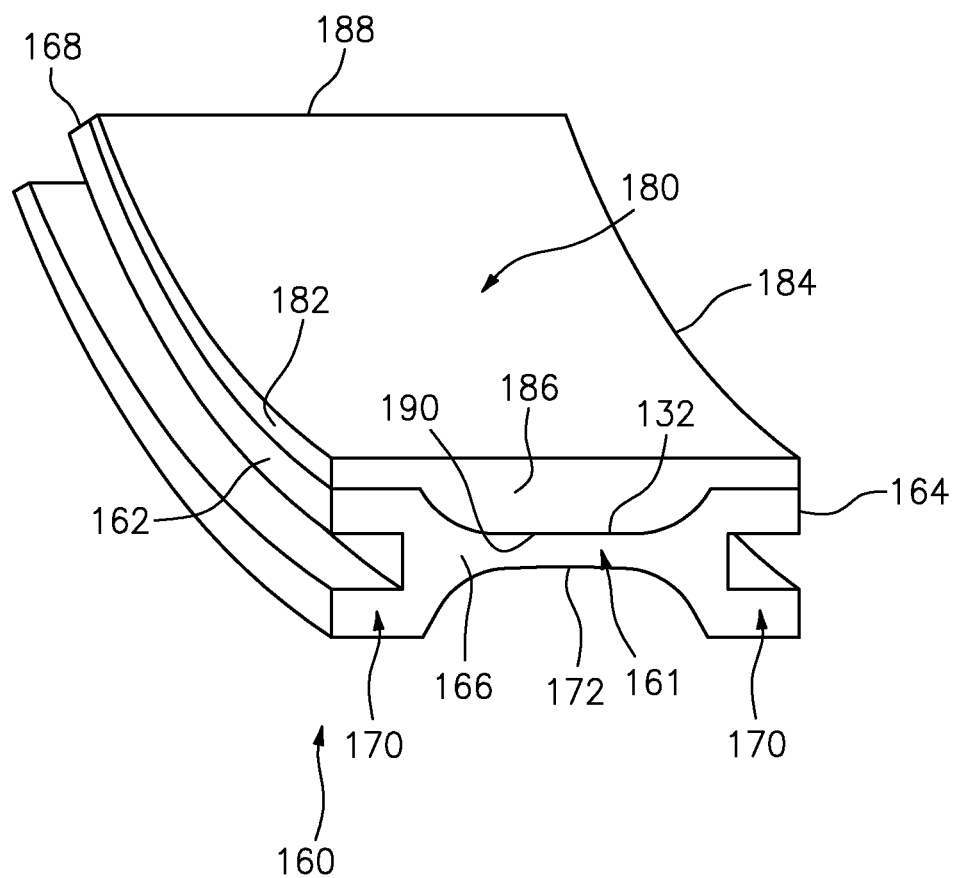
FIG. 3 is a view of a blade rub segment.
Figure 4:
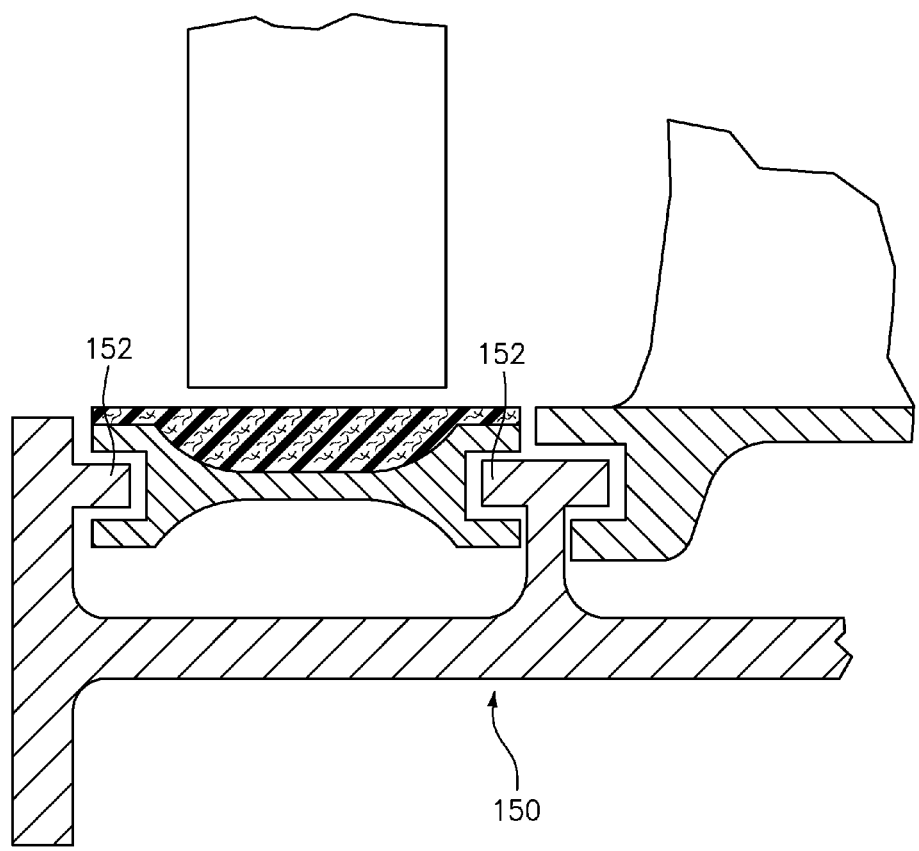
FIG. 4 is longitudinal sectional view of a fan blade tip region of an alternative engine.

FIG. 3 shows a rub strip segment 160 including a segment 161 of the substrate 134 and a segment of the rub material 124. The exemplary segment 160 is dimensioned for use in a fan case 150 (FIG. 4, e.g., itself of a two-piece circumferential segmentation) of a low-bypass military-style turbofan engine. An exemplary 4-20 (more narrowly 6-12) such segments 160 may be assembled to form an annulus circumscribing the engine axis. The substrate segment may be formed as a metallic carrier having a main body with a forward edge 162, a rear edge 164, and first and second circumferential edges 166 and 168. Mounting features 170 (e.g., hooks such as shown or studs, clips, sockets or the like) may be positioned at leading and/or trailing ends or the outer diameter (OD) surface 172 of the body for mounting to complementary features (e.g., rails 152) of the case 150. The ID surface 132 is the ID surface of the body and is transversely concave to match blade sweep. In alternate implementations of such a low-bypass engine, the coating may be molded directly to the fan case substrate (e.g. of a horizontally-split case).

The segment of rub material may have a planform generally coextensive with the planform of the substrate main body. For example, the rub material segment 180 may have a forward edge 182, a rear edge 184, and first and second circumferential edges 186 and 188, each slightly proud of the corresponding substrate main body features. This allows the substrate segments to be spaced slightly apart from each other while allowing snug mating of the rub material segments with each other. It also has an outer diameter (OD) surface 190 along and secured to the ID surface 132.

In an original use situation, a virgin substrate may be manufactured such as by machining (if metallic) or by molding or composite lay-up or other technique, whereafter the rub material may be applied.

After molding, the rub material may be machined, if not molded directly to size, to establish desired dimensions of the surface adjacent to the airfoils and to establish desired clearances at engine build. The rub material may be machined on the individual segments, split case halves, assembled in a fixture as a full circle or in an engine sub-assembly (the last being known as an "assembly grind"). Exemplary machining of the abradable material is by grinding, single point turning, or milling.

In remanufacture situations, after at least partial consumption of the rub material, the remaining rub material may be removed (e.g., mechanically, chemically, and/or thermally). Exemplary mechanical processes include any of the manufacturing machining processes or preferably by water jet strip if the substrate is metallic and can survive the water jet process. A new body of rub material may then be over-molded to the cleaned substrate.

The potential benefits from increasing the thermal conductivity of silicone rubber abradable coating are not limited to fully dense rubber-CNT composites. Thus, the composites may contain other components (e.g., fillers). The benefit of conducting heat away from the rub interface also exists in porous and solid particle filled abradables. For any given filler material (e.g., glass micro-balloons, crushed glass, mineral, polymer fillers such as polyethyle (PE), polymethylmethacrylate (PMMA), acrylonitrile copolymer, etc.) higher conductivity of the polymer matrix achieved with the addition of CNTs may result in lower blade tip temperature. Among such fillers are those disclosed in U.S. Pat. No. 6,334,617 mentioned above and the disclosure of which is incorporated herein by reference in its entirety as if set forth at length. Exemplary overall concentrations of such other fillers is in the range of up to 50% by volume, more particularly 5-33% or 10-20% by volume, whereas the CNT concentration can remain within the same exemplary range as above. Density of CNT and matrix is likely similar. This exemplary combined concentration of CNT and other filler is up to about 60% by volume, more narrowly, up to 50% or 20-40%. Given the weight percentages noted above, exemplary overall CNT concentration is at least about 0.25% by volume, more particularly, 1-20% or 3-10%.

Figure 5:
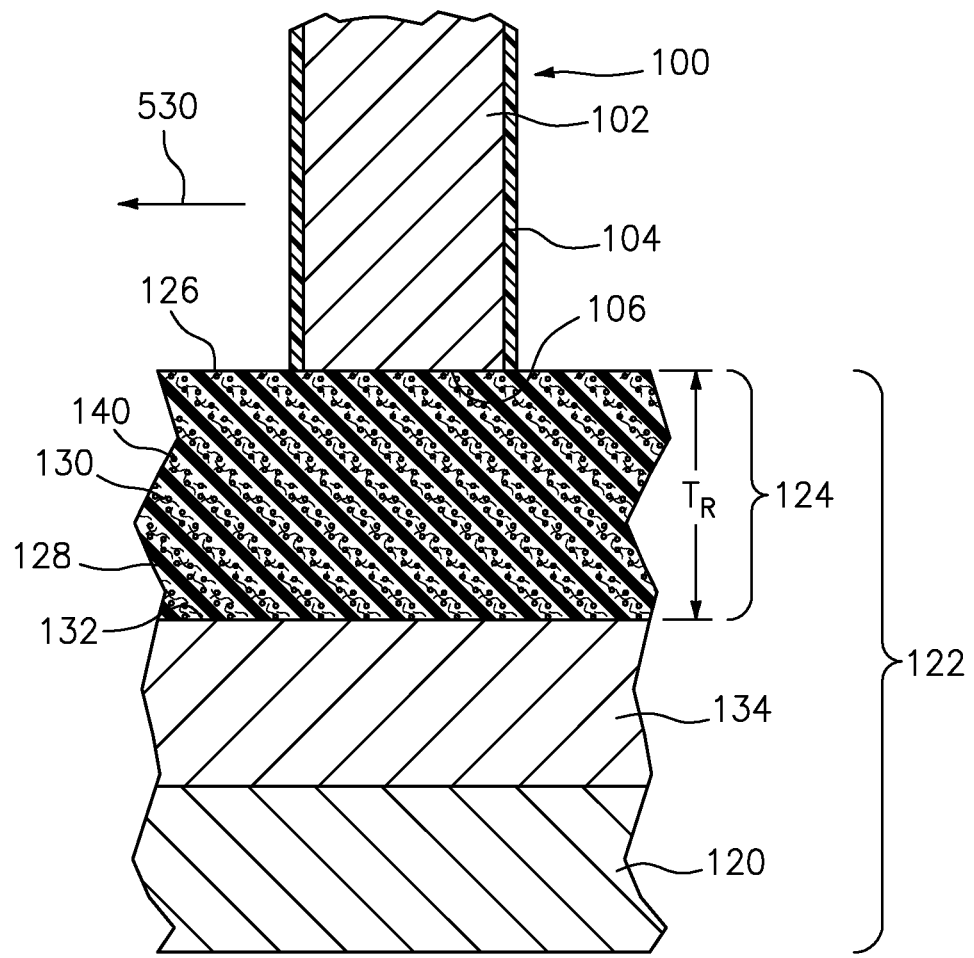
FIG. 5 is an alternative enlarged transverse cutaway view of a fan blade tip region of the engine of FIG. 1 taken along line 2-2 and showing a second rub coating.

One particular example of a beneficial abradable composition uses polymer micro-balloons 140 (FIG. 5) to reduce coating density and improve abradability. Adding Duolite E030 acrylonitrile micro-balloons produced by Henkel Corporation, West Haven, Conn., at from 10-50% by volume to a CNT modified polymer matrix. This would lower the composite density, reduce rub forces, and further reduce blade tip temperature by reducing the energy required to cut (rub-induced wear) of the abradable.

One or more embodiments have been described. Nevertheless, it will be understood that various modifications may be made. For example, when applied in the redesign of a baseline engine configuration or for the remanufacturing of a baseline engine, details of the baseline will influence details of any particular implementation. Accordingly, other embodiments are within the scope of the following claims.

What is claimed is:

1. A turbomachine (20) comprising:
a plurality of blades (100), each blade having a tip, the blades mounted for rotation about an axis;
a case (28) surrounding the plurality of blades and having:
a substrate (134); and
a coating of blade rub material (124) on the substrate facing the blade tips, the rub material comprising:
a polymeric matrix (128);
carbon nanotubes (130) in the matrix; and
5% to 33% by volume additional filler comprising hollow glass micro-balloons or hollow polymeric micro-balloons.

2. The turbomachine of claim 1 wherein:
the matrix (128) comprises a silicone.

3. The turbomachine of claim 1 wherein:
the rub material is at least 1.0 mm thick.

4. The turbomachine material of claim 2 wherein:
the silicone is selected from the group consisting of dimethyl- and fluoro-silicone rubbers and their copolymers.

5. The turbomachine of claim 1 wherein:
the carbon nanotubes (130) at least locally have a concentration of 1-20% by weight.

6. The turbomachine of claim 5 wherein:
over a depth of at least 1 mm, the carbon nanotubes (130) have said concentration of 1-20% by weight.

7. The turbomachine of claim 5 wherein:
over a depth of at least 1 mm, the carbon nanotubes (130) have said concentration of 3-10% by weight.

8. The turbomachine of claim 1 wherein:
the carbon nanotubes (130) have diameters of 1-40 nm.

9. The turbomachine of claim 1 wherein:
the carbon nanotubes (130) have aspect ratios of 250-25,000:1.

10. The turbomachine of claim 1 wherein the rub material is injection molded in situ to a substrate (134) or separately injection molded and bonded to the substrate.

11. The turbomachine of claim 1 wherein:
the blades comprise an aluminum-based substrate (102) and a polyurethane coating (104).

12. The turbomachine of claim 1 being a gas turbine engine wherein:
the plurality of blades are a fan blade stage.

13. The turbomachine of claim 12 wherein:
the blades comprise an aluminum alloy or a titanium alloy.

14. A blade rub segment (160) comprising:
a substrate (134); and
a coating of rub material (124) on the substrate, the rub material comprising:
a thermoset polymeric matrix (128); and
carbon nanotubes (130) in the matrix.

15. The blade rub segment of claim 14 wherein:
the substrate has a transversely concave first surface (132) and an opposite second surface (172) and a plurality of mounting features (170).

16. The blade rub segment of claim 14 wherein:
the coating has a transversely concave first surface (126) and an opposite second surface (190) secured to the substrate.

17. A method for manufacturing the blade rub segment of claim 14, the method comprising:
dispersing the carbon nanotubes in uncured polymer for the matrix material by high shear mixing.

18. The method of claim 17 wherein:
the carbon nanotubes are first dispersed in a solvent.

19. The method of claim 17 further comprising:
dispersing a polymer filler (140) into the uncured matrix by high shear mixing.

20. The method of claim 17 further comprising:
injection molding of the uncured polymer and dispersed carbon nanotubes.

21. The turbomachine of claim 1 wherein:
the matrix (128) is a thermoset matrix.

22. The turbomachine of claim 2 wherein:
the silicone is a thermoset silicone.

* * * * *